Oct. 8, 1929.  L. H. MILES  1,730,468
AUTOMATIC DIRIGIBLE SPOTLIGHT
Filed April 5, 1926  2 Sheets—Sheet 1
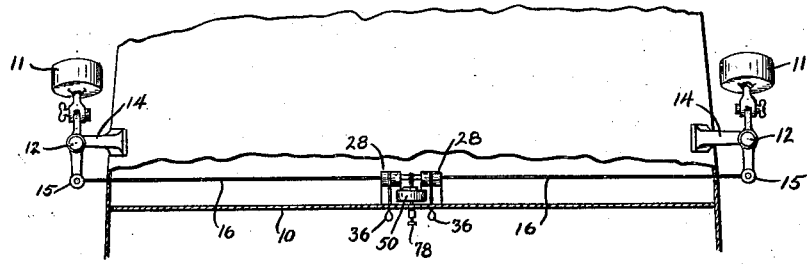
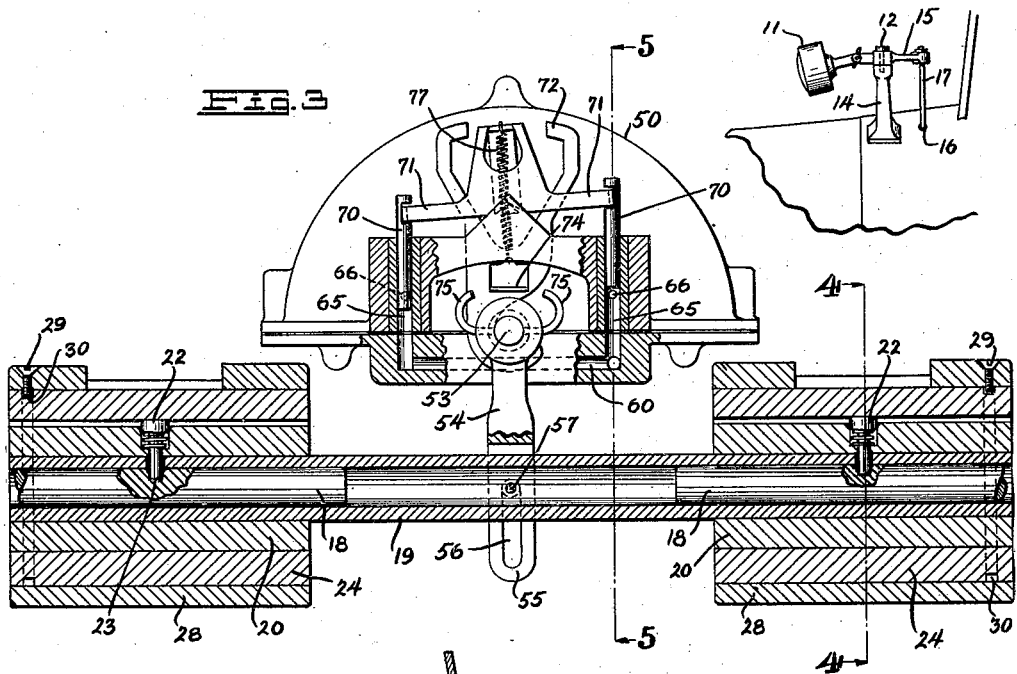
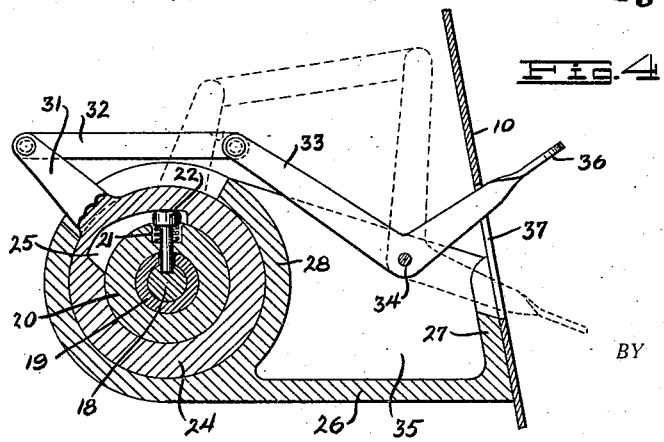
INVENTOR.
LESTER H. MILES
BY
ATTORNEY.

Oct. 8, 1929.  L. H. MILES  1,730,468
AUTOMATIC DIRIGIBLE SPOTLIGHT
Filed April 5, 1926  2 Sheets-Sheet 2
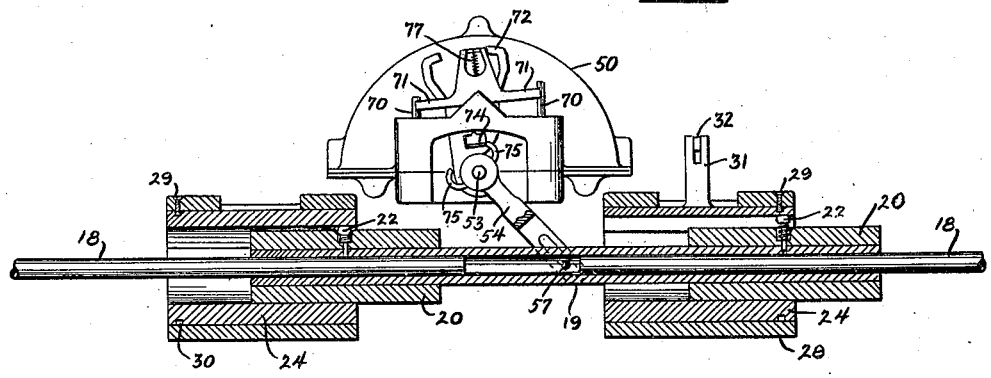
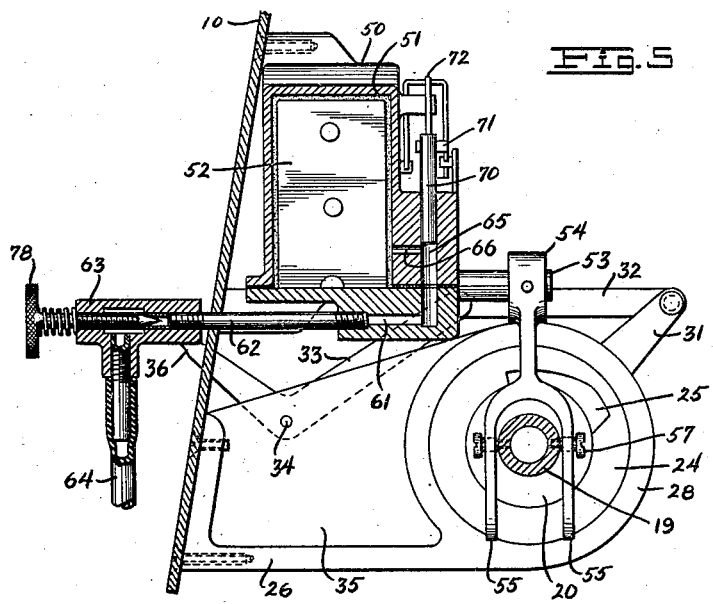
INVENTOR.
LESTER H. MILES
BY
ATTORNEY.

Patented Oct. 8, 1929

1,730,468

UNITED STATES PATENT OFFICE

LESTER H. MILES, OF LOS ANGELES, CALIFORNIA

AUTOMATIC DIRIGIBLE SPOTLIGHT

Application filed April 5, 1926. Serial No. 99,722.

This invention relates to automatic dirigible spot lights.

The general object of the invention is to provide a spot light having means associated therewith for swinging the spot light back and forth automatically so that the driver of a vehicle equipped with this spot light will be enabled to see conditions at the side of the road as well as in front.

A specific object of the invention is to provide a dirigible spot light with novel means for causing the spot light to swing back and forth laterally.

Another object of the invention is to provide a dirigible spot light with vacuum operated means for swinging the spot light laterally.

Other objects of the invention will be apparent from the following description taken in connection with the accompanying drawings, wherein:

Fig. 1 is a plan of a portion of an automobile showing my invention applied thereto:

Fig. 2 is an elevation of one of the spot lights;

Fig. 3 is a central sectional view through the operating member showing details of the vacuum operated device;

Fig. 4 is a section on line 4—4, Fig. 3;

Fig. 5 is a section on line 5—5, Fig. 3;

Fig. 6 is a central sectional view showing the operating member in one extreme position and Fig. 7 is a sectional view showing the vacuum operated vane and associated parts.

Referring to the drawing by reference characters, I have illustrated the instrument board of an automobile at 10. Mounted upon this instrument board I show a pair of spot lights 11 which are mounted to turn about vertical pivots 12.

In the following description, I will refer to a pair of spot lights, but it will be understood that I may use but one spot light, if desired, without departing from the spirit of my invention.

Each spot light is mounted upon a bracket 14 and is provided with an arm 15 by which the spot light may be swung laterally.

Each arm 15 is engaged by an operating member 16. Each operating member has an upstanding portion 17 which engages an arm 15 and has a portion 18 at one end which fits within a sleeve 19.

Adjacent to each end portion 18 I mount a tubular member 20 which surrounds the ends of the sleeve 19. Each tubular member 20 is provided with a recess 21 in its upper surface and in this recess I slidably mount a headed pin 22 which is normally urged upwardly by a spring as shown. The shank of each pin 22 passes through an aperture in the sleeve 19 and is adapted to fit within a hole 23 in the operating member 18.

In normal position the pin 22 is raised by the spring so that the shank of the pin is out of engagement with the operating member 18. In order to urge the pin 22 to position in the hole 23, I mount a rotatable sleeve 24 about each tubular member 20. This sleeve 24 is provided with a cutaway portion which defines a slot 25 in which the head of the member 22 fits.

The slot 25 is deep at one end and shallow at the other end so that in one position the headed member 22 will be forced inwardly to the position shown in Fig. 4, so that the shank thereof will engage in the hole 23 to thereby clutch the operating member 18 to the sleeve 19.

When a sleeve 20 is turned through a partial rotation the head of the member 22 will move into the deeper portion of the slot 25, being urged to this position by the spring so that each operating member 18 is released from engagement with the sleeve 19.

Each sleeve 24 is mounted on a bracket 26 which has a flange 27 thereon engaging the instrument board 10. This bracket 26 includes a cylindrical portion 28 in which the sleeve 24 is mounted to rotate. This cylindrical portion 28 is provided with a pin 29 which fits within a keyway 30 in the sleeve 24. The sleeve 24 is provided with an arm 31 which is connected by a link 32 with a bell crank 33 pivoted at 34 to a web 35 on the bracket 26. The bell crank 33 includes an operating handle 36 which projects through an aperture 37 in the instrument board.

From the foregoing description it will be apparent that when either operating handle 36 is moved upwardly, that the sleeve 19 will be clutched to the operating member 18 and that when the handle 36 is moved downwardly to the dotted line position shown in Fig. 4, the sleeve 19 will be disengaged from the operating member 18.

From the foregoing description it will be apparent that upon reciprocating movement of the sleeve 19 the operating members 18 will be caused to move to thereby swing the spotlights when the operating handle is in one position and that by moving the operating handles either one or both of the spot lights may be held inactive while the sleeve 19 is moving.

In the accompanying drawings I have shown a vacuum operated device for moving the sleeve 19. As shown, this device comprises a hollow body 50 which may be held in place in any desired manner. This body 50 is provided with a semi-cylindrical cavity 51 in which a vane 52 is mounted to swing back and forth on a shaft 53. This shaft 53 has a yoke 54 mounted thereon and the arms 55 of this yoke have slots 56 therein through which pins 57 on the sleeve 19 project. It will thus be seen that as the vane 52 swings back and forth, the yoke 54 will reciprocate the sleeve 19 and thus swing the spot lights.

The cavity 51 has a passage 60 therein which communicates through a passage 61 with a pipe 62. This pipe 62 is connected to a valve member 63 which is in communication through a pipe 64 with a vacuum tank or other partially exhausted container, (not shown).

The passageway 60 terminates at each end in vertical passages 65 which at their upper ends communicate through passages 66 with the chamber 51. Communication between the passages 65 and 66 is shown as controlled by valve members 70 which are adapted to be moved alternately by a pivoted rocking arm 71. This rocking arm is rocked by engagement with an inverted stirrup 72 which is provided with a projecting plate 74. This plate 74 is adapted to be engaged by bent arms 75 arranged on the shaft 53, and the construction is such that when the yoke 54 is in either extreme position as shown in Fig. 6 one bent arm 75 will engage one side of the plate 74 to push this plate laterally thereby moving the inverted stirrup 72 and causing one arm of the stirrup to rock the arm 71 thereby moving the valve members 70 so that the vacuum acts against the other side of the vane 52 to move the vane. As soon as the vane reaches its other extreme position the valves will again be shifted so that the operation will be repeated indefinitely.

The rocking arm 71 is engaged by a spring 77 to hold it in each shifted position. By operating the thumb screw 78 of the valve 73 the speed of operation can be controlled.

From the foregoing description it will be apparent that I have provided a dirigible spot light which will be automatically swung back and forth and that I have provided means for controlling the rate of movement of the spot light.

Having thus described my invention, I claim:

1. In combination with a spot light, a supporting member, means to pivotally mount said spot light on said supporting member, an operating member mounted on said spot light, means to reciprocate said member and said spot light, said means comprising a vacuum operated device and means independent of the mounting of the spot light to cause said operating member to be idle while said device operates.

2. In a dirigible lighting device including a supporting member, a spot light mounted on said supporting member and movable about a vertical axis, an operating rod pivotally mounted on said spot light, a sleeve spaced from said spot light and in which said operating rod is mounted, means to clutch said sleeve to said rod, means to release said sleeve from said rod and means to reciprocate said sleeve, said means comprising a vacuum operated device.

3. In an automatic spot light including a supporting member, a pair of spot lights mounted on said supporting member and movable about a vertical axis, an operating member pivotally mounted on each spot light, a second member engaging said operating member, means to clutch said members together, means to release said members from engagement with each other and means to reciprocate said second member, said means comprising a vacuum operated device including a pivoted lever engaging said second member, a vacuum chamber, a vane mounted to move in said vacuum chamber, said vane engaging said lever, and means to intermittently produce vacuum on opposite sides of said vane to cause reciprocation thereof.

4. In combination with a support, a pair of spot lights pivotally mounted thereon, an operating rod pivotally connected to each spot light, a sleeve in which said operating rods are mounted, means to clutch said sleeve to each of said rods, means to disengage either of said sleeves from said rod and means to reciprocate said sleeve, said last mentioned means comprising a vacuum operated device including a lever engaging said sleeve, a vacuum chamber, a vane mounted to move in said vacuum chamber, a shaft on said vane, said shaft engaging said lever and means to intermittently produce vacuum on opposite sides of said vane to cause reciprocation thereof whereby said lever will be rocked and said lights will be reciprocated.

5. In a dirigible lighting device, a pair of pivotally mounted spot lights, power operated means mechanically connected to said spot lights to continuously shift them back and forth laterally, and means independent of the mounting of the spot light and operable at will to disengage said power operated means from one or both of said spot lights.

6. In combination with a pair of spot lights, a support for each light, means to pivotally mount said spot lights on said support, an operating member mounted on each spot light, a second member engaging said operating member, means to cause said two members to move together, means to release said last mentioned means and means to automatically and continuously reciprocate said second member, said means comprising a vacuum operated device.

In testimony whereof, I hereunto affix my signature.

LESTER H. MILES.